(12) United States Patent
Etgen et al.

(10) Patent No.: US 7,937,715 B2
(45) Date of Patent: May 3, 2011

(54) MECHANISM FOR GENERATING DYNAMIC CONTENT WITHOUT A WEB SERVER

(75) Inventors: Michael Peter Etgen, Cary, NC (US); Douglas Earl Hays, Nicholasville, KY (US); Thomas Paul Pitzen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1649 days.

(21) Appl. No.: 11/211,398

(22) Filed: Aug. 25, 2005

(65) Prior Publication Data

US 2007/0050476 A1    Mar. 1, 2007

(51) Int. Cl.
*G06F 3/00*  (2006.01)
*G06F 9/44*  (2006.01)
*G06F 9/46*  (2006.01)
*G06F 13/00*  (2006.01)

(52) U.S. Cl. ...................................... 719/320; 719/319
(58) Field of Classification Search .................. 719/310, 719/313; 715/249
See application file for complete search history.

(56) References Cited

U.S. PATENT DOCUMENTS

| | | | | |
|---|---|---|---|---|
| 6,951,014 | B1 * | 9/2005 | Sokolov | 717/139 |
| 7,376,653 | B2 * | 5/2008 | Hart, III | 707/10 |
| 2002/0107892 | A1 | 8/2002 | Chittu et al. | 707/514 |
| 2004/0034831 | A1 | 2/2004 | Grober et al. | 715/507 |
| 2004/0258089 | A1 | 12/2004 | Derechin et al. | 370/465 |
| 2009/0119580 | A1 * | 5/2009 | Rohrabaugh et al. | 715/249 |

FOREIGN PATENT DOCUMENTS

WO    02/44977  A    6/2002

OTHER PUBLICATIONS

Thomason, JavaScript Tip: Page Headers and Footers, NetMchanic, Inc, May 2001, pp. 1-5.*
DevEdge, Chapter 9: Embedding JavaScript in HTML, Netscape Communications Corporation, 1999, pp. 1-7.*
W3C, HTML 4.01 Specification, W3C, Dec. 1999, pp. 1-s5.*
Goodman, D., "Chapter 13: JavaScript Essentials," JavaScript Bible, 3rd ed., Internet 1988, pp. 143-166.
Wood, L. et al, Document Object Model (DOM) Level 1 Specification (Second Edition), V1, http://www.w3.org/TR/2000/WD-DOM-Level-1-20000929/DOM.pdf, Sep. 29, 2000, pp. 1-14, 90-91.
Shore, P. et al, "script src param using a var question/problem," Internet, Jul. 27, 2000, p. 3.
Microsoft Corporation: "Script Element—script object," Internet, Dec. 16, 2000, http://web.archive.org/web/20021216054102/http://msdn.microsoft.com/workshop/author/dhtml/reference/objects/script.asp>.
WebCream White Paper, CreamTec, LLC, 5 pages, 2001.

(Continued)

*Primary Examiner* — Diem K Cao
(74) *Attorney, Agent, or Firm* — Lee Law, PLLC; Christopher B. Lee

(57) ABSTRACT

A method, data processing system, and computer usable code are provided for generating content dynamically without a Web server. Responsive to a request to display a document containing markup language content on a client data processing system, a determination is made as to whether a utility script is present in the document. A utility application associated with the utility script is loaded on the client data processing system, if the utility script is present. Then, the utility application processes the utility script to dynamically generate dynamic content for display with markup language content.

18 Claims, 6 Drawing Sheets

OTHER PUBLICATIONS

Kalinowsky, "Savor success with Java on the front end", JavaWorld, Apr. 2001, pp. 1-10.

Brown, "Pump up your Web site with coding tools", Microsoft Office Online, pp. 1-5. 2005.

"EZ JavaScript", SouthEast Software, SnapFiles, Jul. 18, 2002, pp. 1-2.

"WebSmart4: New Features Highlights", ExcelSystems Software Development Inc., 2005, pp. 1-5.

"JavaScript", Chapter 13, Executable Content, HTML: The Definitive Guide, pp. 1-7, 2002.

"HTML2JS", Website SnapFiles, Mar. 9, 2001, pp. 1-2. http://www.snapfiles.com/get/htmltojs.html.

* cited by examiner

```
ProcessText
    While not end of text
        Get next token
        If token starts with "<%"
            Find matching "%>" token
            If token = "<%="
                Evaluate expression text
                Call document.write with the expression return value
            Else If token = "<%@"
                Read include file
                Call ProcessText recursively on file contents
            Else
                Call document.write with the scriptlet contents
        Else
            Call document.write with the raw HTML text
    EndWhile
```

FIG. 6

```
     ┌ <html>
     │ <body>
     │ <script src="jscp.js">
     │ <table width="100%" cellpadding="<%= cellpadding %>" cellspacing="0">
     │   <tr valign="top"><td align="right">
     │ <% if (top.browser == "Mozilla") { %>
     │  <img src="<%= top.findURL(null,'images/ibm_logo.gif')) %>">
702 ┤ <% } else { %>
     │  <img src="<%= top.findURL(null,'images/ibm_logo.jpg')) %>">
     │ <% } %>
     │   </td></tr>
     │ </table>
     │ </script>
     │ </body>
     └ </html>

┌ <table width="100%" cellpadding="<%= cellpadding %>" cellspacing="0">
     │   <tr valign="top"><td align="right">
     │ <% if (top.browser == "Mozilla") { %>
     │  <img src="<%= top.findURL(null,'images/ibm_logo.gif')) %>">
704 ┤ <% } else { %>
     │  <img src="<%= top.findURL(null,'images/ibm_logo.jpg')) %>">
     │ <% } %>
     │   </td></tr>
     └ </table>

┌ document.writeln('<SCRIPT language="JavaScript">');
     │ document.write('<table width="100%" cellpadding="');
     │ document.write(cellpadding);
     │ document.writeln('" cellspacing="0">');
     │ document.writeln('<tr valign="top"><td align="right">');
     │ if (top.browser == "Mozilla") {
     │ document.write('<img src="');
706 ┤ document.write(top.findURL(null,'images/ibm_logo.gif')));
     │ document.writeln('">');
     │ } else {
     │ document.write('<img src="');
     │ document.write(top.findURL(null,'images/ibm_logo.jpg')));
     │ document.writeln('">');
     │ }
     │ document.writeln('</td></tr>');
     │ document.writeln('</table>');
     └ document.writeln('</SCRIPT>');
```

FIG. 7

802 {
```
Example css file, "dynamicStyle.css":
    /* Dynamic css file example */
    h2 {
        color:blue;
    }

.style1 {
        background-color:silver;
        height:<%= divHeight %>; /* Using javascript variable */
    }

.para_style {
        /* Set background based on user property */
        background-color:<%=property("myBackgroundColor","white")%>;
    }
```

804 {
```
Example properties file:
    myBackgroundColor="red"
```

806 {
```
Example html file:
    <!DOCTYPE HTML PUBLIC "-//W3C//DTD HTML 3.2//EN">
    <HTML>
    <HEAD>
    <META HTTP-EQUIV="Content-Type" CONTENT="text/html; charset=UTF-8">

<script src="../../jscp.js">
    <%
    var divHeight="200px";

loadCSSfiles("dynamicStyle.css");
    %>
    </script>

</head>

<body>
    <h1>This is the main page</h1>

<div class="style1">
    <h2>This header is within the main div style</h2>

<p class="para_style">
    This is the main paragraph for this page.
    </p>

</div>
    </body>
    </html>
```

FIG. 8

MECHANISM FOR GENERATING DYNAMIC CONTENT WITHOUT A WEB SERVER

BACKGROUND OF THE INVENTION

1. Field of the Invention

The present invention relates generally to generating content. More particularly, the present invention relates to generating content dynamically without a Web server.

2. Description of the Related Art

The classic Web application model operates by user actions in the interface trigger of a hypertext transfer protocol request back to a Web server. The server does some processing—retrieving data, crunching numbers, talking to various legacy systems—and then returns a hypertext markup language page to the client. The classic Web application model is adapted from the Web's original use as a hypertext medium, but what makes the Web good for hypertext does not necessarily make it good for software applications.

The Web application model used extensively today contains two main components: a thin, Web-based client and a thick, Web/application server. The thin client communicates with the server using several common mechanisms like Java Server Pages™, JavaScript™ forms, and servlets. The server component is responsible for generating hypertext markup language content that is sent back to the thin client to be rendered. However, often a Web application needs to run on the client itself, and it is not practical to setup a server on the same node as the client just to handle the dynamic content.

One such example is an installation application. In this case, the application needs to run on the client machine and is used to install one or more software products. Due to time, resource, and even licensing restraints, it is not practical for a Web server to be preinstalled and configured solely to enable dynamic content of the installer application.

BRIEF SUMMARY OF THE INVENTION

The different aspects of the present invention provide a method, data processing system, and computer usable code for generating content dynamically without a Web server. In response to a request to display a document containing markup language content on a client data processing system, a determination is made as to whether a utility script is present in the document. If a utility script is present, a utility application associated with the utility script is loaded on the client data processing system. The utility application then processes the utility script to dynamically generate dynamic content for display with markup language content.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts exemplary pseudo code of the operation of generating dynamic hypertext language markup content without a Web server in accordance with an illustrative embodiment of the present invention; and FIG. 7 is exemplary code that is processed using the utility application in accordance with an illustrative embodiment of the present invention.

FIG. 8 is exemplary code including a cascading style sheets file that is processed using the utility application in accordance with an illustrative embodiment of the present invention.

DETAILED DESCRIPTION OF THE INVENTION

Figure 1:
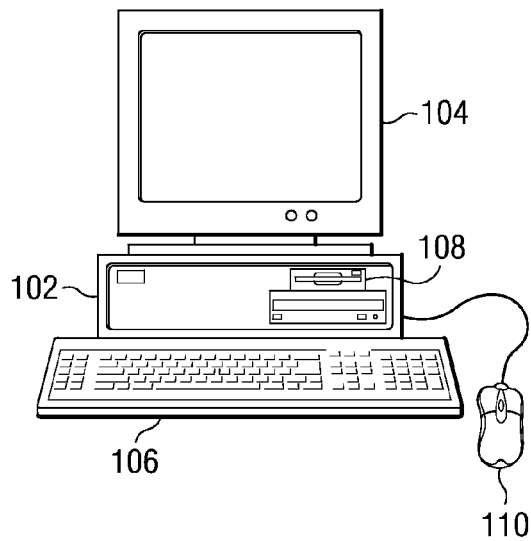
FIG. 1 is a pictorial representation of a data processing system in which the aspects of the present invention may be implemented.
Figure 2:
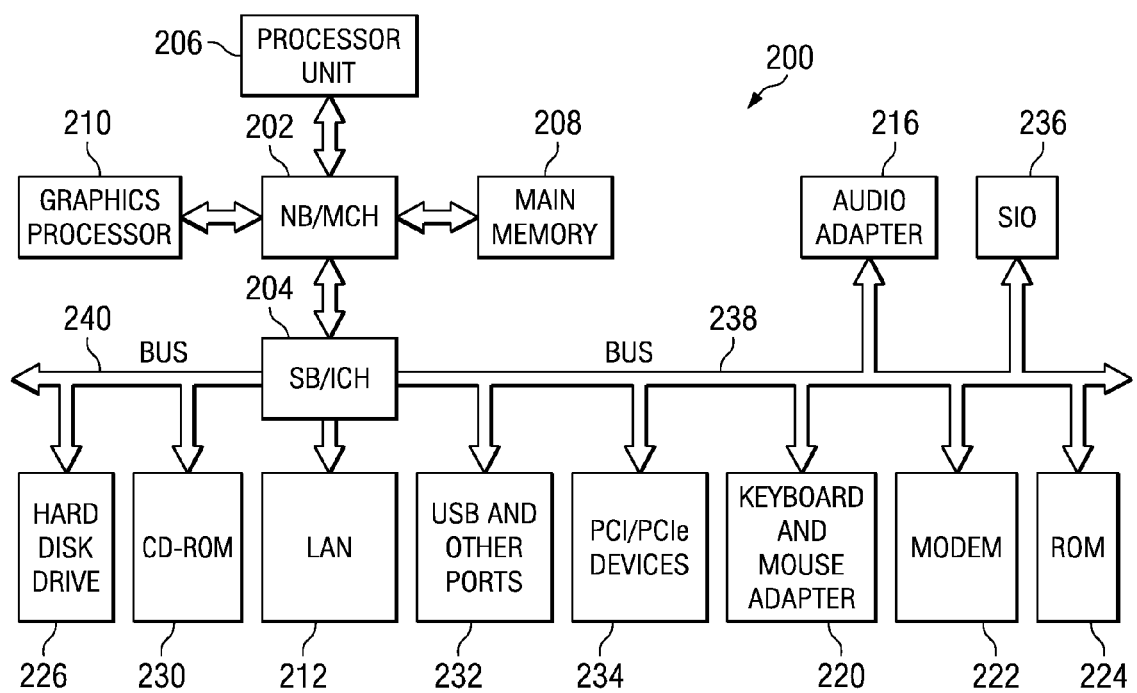
FIG. 2 is a block diagram of a data processing system is shown in which aspects of the present invention may be implemented.

The present invention provides a method, data processing system and computer usable code for generating content dynamically without a Web server. FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention provide for generating content dynamically without a Web server. In response to a request to display a document containing markup language content on a client data processing system, a determination is made as to whether a utility script is present in the document. If a utility script is present a utility application associated with the utility script is loaded on the client data processing system. The utility application then processes the utility script to dynamically generate dynamic content for display with markup language content. A utility script may be any markup language, such as JavaServer Pages™, that needs to be processed by a utility application, which is an application that processes scripts.

Figure 3:
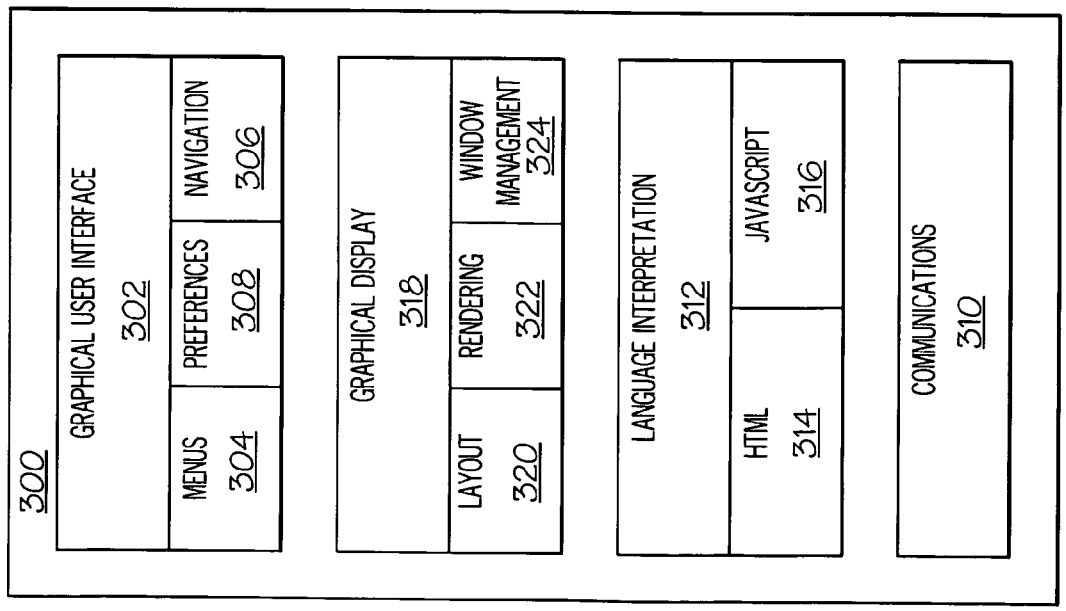
FIG. 3 is a block diagram of a browser program is depicted in accordance with an illustrative embodiment of the present invention.

Turning next to FIG. 3, a block diagram of a browser program is depicted in accordance with an illustrative embodiment of the present invention. A browser is an application used to navigate or view information or data in a distributed database, such as the Internet or the World Wide Web.

In this example, browser 300 includes a user interface 302, which is a graphical user interface (GUI) that allows the user to interface or communicate with browser 300. This interface provides for selection of various functions through menus 304 and allows for navigation through navigation 306. For example, menus 304 may allow a user to perform various functions, such as saving a file, opening a new window, displaying a history, and entering a uniform resource locator. Navigation 306 allows for a user to navigate various pages and to select Web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communication 310 uses hypertext transfer protocol. Other protocols may be used depending on the implementation. Documents that are received by browser 300 are processed by language interpretation 312, which includes a hypertext markup language unit 314 and a JavaScript™ language unit 316. Language interpretation 312 will process a document for presentation on graphical display 318. In particular, hypertext markup language statements are processed by hypertext markup language unit 314 for presentation while JavaScript™ language statements are processed by JavaScript™ language unit 316.

Graphical display 318 includes layout unit 320, rendering unit 322, and window management 324. These units are involved in presenting Web pages to a user based on results from language interpretation 312. Graphical display 318 may be any type of display such as video display terminal 104 of FIG. 1.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

Figure 4:
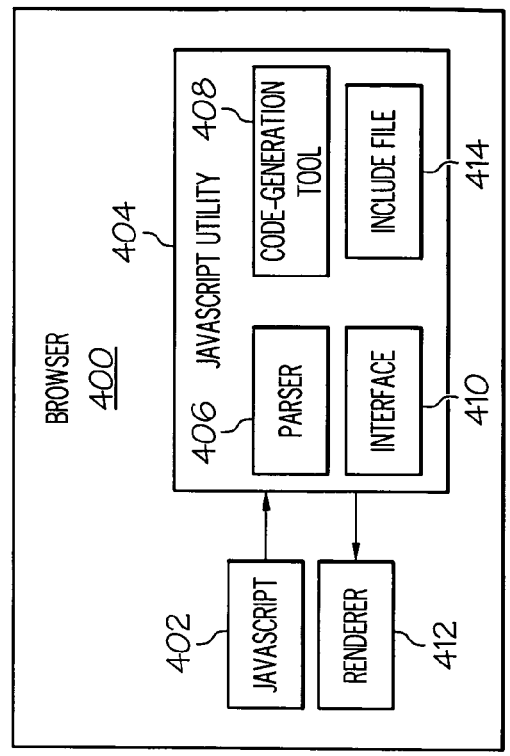
FIG. 4 is a functional block diagram of JavaScript™ pages utility interfacing within a browser in accordance with an illustrative embodiment of the present invention.

FIG. 4 is a functional block diagram of JavaScript™ pages utility interfacing within a browser such as browser 300 of FIG. 3 in accordance with an illustrative embodiment of the present invention. The JavaScript™ pages utility 404 uses a client-side scripting language like JavaScript™ language 402 supported by all modern browsers, such as browser 400. Using a scripting language like JavaScript™ language 402 permits Web page authors to intersperse code inserts and variable references along with raw hypertext language markup tags and content. Some exemplary code inserts that may be included by Web page authors are <SCRIPT> and </SCRIPT>.

As an exemplary aspect of the present invention, JavaScript™ pages utility 404 is integrated into browser 400 as a permanent utility application. JavaScript™ pages utility 404 also includes parser 406, code-generation tool 408 and interface 410. As part of the normal operation of a browser such as browser 400, hypertext language markup tags and content is read and rendered by renderer 412. However, during this process a hypertext language markup tag such as <SCRIPT> may be encountered. Upon encountering such a hypertext language markup tag, JavaScript™ pages utility 404 is loaded by browser 400 while continuing to render other hypertext language markup tags and content. JavaScript™ pages utility 404 then parses, using parser 406, the hypertext language markup tags and content looking for the hypertext language markup tag that initiated JavaScript™ pages utility 404. In this case, parser 406 looks for hypertext language markup tag, <SCRIPT>.

JavaScript™ pages utility 404 then executes any sequence of hypertext markup language and JSP-like supported syntax text, as long as no other hypertext markup language tag, <SCRIPT>, is encountered. Exemplary types of JSP-like supported syntax that may be processed are Expression, Scriplet, and Include Directive, although any type of JSP-like supported syntax may be processed. JavaScript™ pages utility 404 then parses all of the text using parser 406, generates appropriate document.write application program interface calls using code-generation tool 408, and implements the special JSP-like command interface using interface 410. The information generated via JavaScript™ pages utility 404 is then rendered using renderer 412 on browser 400. The information via JavaScript™ pages utility 404 may be any type of text that is capable of being rendered by a browser such as JavaScript™ language or hypertext markup language. Thus, as an exemplary aspect of the present invention, instead of making a call to a server, such as calling getDay( ), which is built into the JavaScript™ language, the present invention will call other routines via published browser application program interfaces to read client side files from the client computer (such as from installation media) to dynamically configure client content and generate dynamic content.

As an additional aspect of the present invention, a Web page author may embed dynamic content using JavaScript™ client pages (JSCP) syntax within an include file 414 and then reference include file 414 as a JavaScript™ client pages "file include" in their hypertext markup language source file. Include file 414 may be any type of file such as cascading style sheet (CSS) file. With this approach, include file 414 may have dynamic content, but may be separated from the hypertext markup language content allowing for easier maintenance and project organization.

In using JavaScript™ client pages in a hypertext markup language file, JavaScript™ pages utility 404 would be directed to "include" include file 414. JavaScript™ pages utility 404 will in-line include file 414 contents, expanding any JavaScript™ client pages substitution tags as it does so. In the case of a cascading style sheet file, the generated contents will be within a <style> element. Browser 400 will then read this converted content as any normal in-lined style content.

Figure 5:
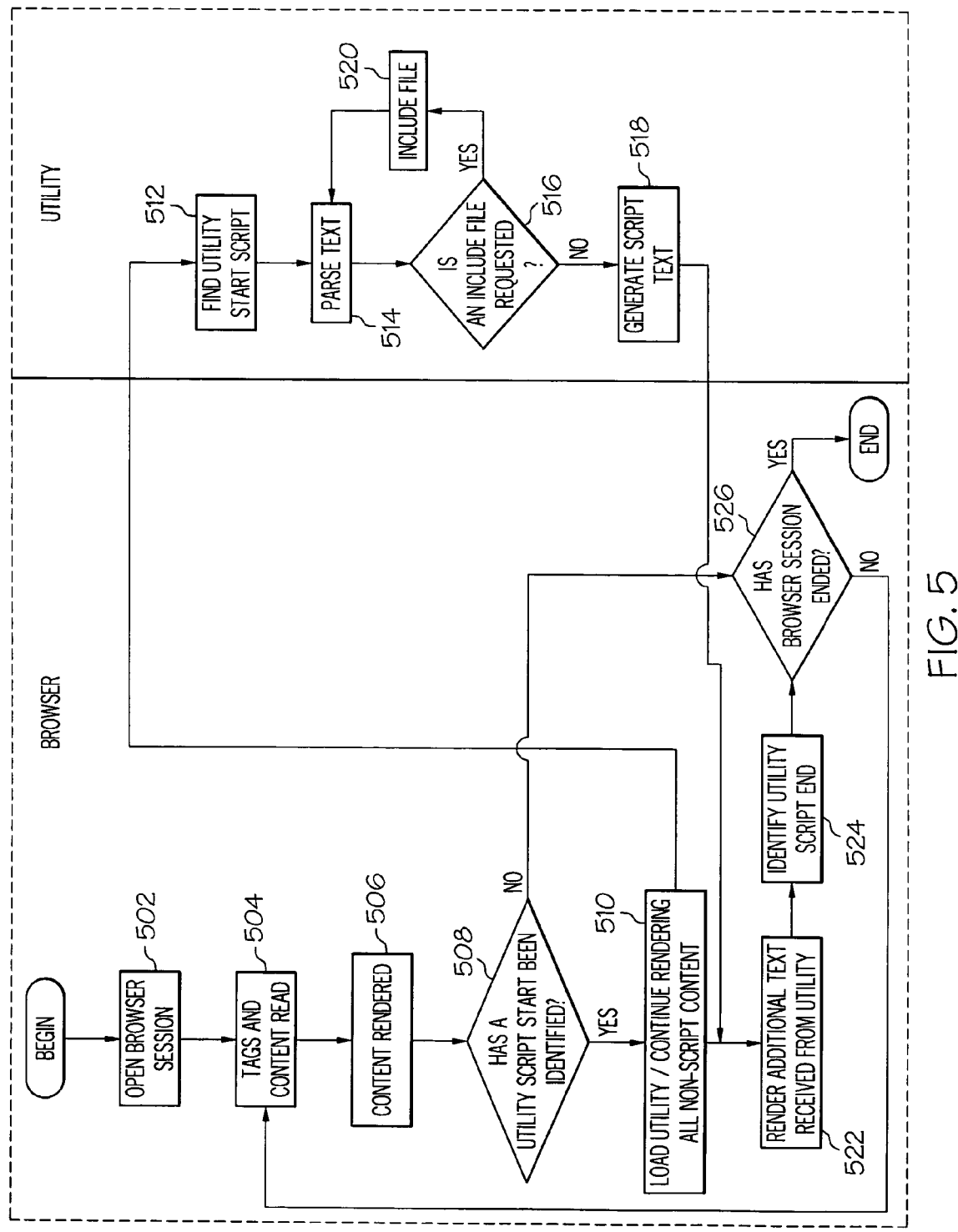
FIG. 5 is a flow diagram depicting the operation of generating dynamic hypertext language markup content without a Web server in accordance with an illustrative embodiment of the present invention.

FIG. 5 is a flow diagram depicting the operation of generating dynamic markup language content without a Web server in accordance with an illustrative embodiment of the present invention. The following operation is performed in a browser using a utility such as browser 400 and JavaScript™ pages utility 404 of FIG. 4. As the operation begins the browser opens a browser session in response to a user input (step 502), and the browser reads the markup language tags and content (step 504) associated with a requested document. Tags and content may be any type of tags and content such as hypertext markup language tags and content. The browser then renders the markup language content on the in a window in the user's display (step 506). A determination is made as to whether a utility script start has been identified (step 508). In step 508, markup language tags and content are being read and rendered the browser may identify a utility script within the markup language tags and content. If the browser does not identify a utility script within the markup language tags and content in step 508, then the browser determines whether the browser session has ended (step 520), such as the user closing the browser window.

Returning to step 508, if the browser identifies a utility script within the markup language tags and content, then browser loads and starts the utility application with the browser continuing to render all non-script content (step 510). Once the utility application is loaded, the utility application finds the start of the utility script, for example, <SCRIPT> (step 512). Then, the utility application parses all of the text contained within the utility script (step 514). In parsing the text of the script, a determination is made as to whether a include file is requested (step 516). If at step 516 a determination that an include file has not been included, then the utility application generates appropriate document.write application program interface calls, and implements a special JSP-like command interface (step 518). If at step 516 a determination that an include file has been included, then the utility application is directed to "embed" the include file (step 520). The utility application in-lines the contents of the include file, expanding any JavaScript™ client pages substitution tags as it does so. In the case of a cascading style sheet file, the generated contents will be within a <style> element. After the include file is read, the operation returns to step 514, where the included text is parsed and read for more JSP-like commands. As the operation then proceeds to step 516, the included file is already included and, thus, the operation will proceed to step 518. At step 518, the utility application then generates appropriate document.write application program interface calls, and implements a special JSP-like command interface.

Thus, the utility application does not retrieve information from remote sources, but, instead, parses and generates content for the browser directly from the client. The only file input or output would a client file that was requested to be included and parsed via a specific filename. Based upon the content of the utility script that is being parsed, the utility application may generate hypertext markup language for the browser when read and processed by the browser. This may cause a multitude of image and audio files to subsequently be read and processed by the browser, or even additional remote Web server activity. But this is a property of the content that the Web page author wants to be generated but is not part of the script parsing and generation.

The information generated by the utility application is then sent to the browser where this information is rendered on the user's display (step 522). Scripted information is generated and rendered until a tag indicating the end of the script is encountered, for example, </SCRIPT> (step 524). The operation then proceeds to step 526 where a determination is made as to whether the browser session has ended. If the browser session has not ended, then the operation returns to step 504 where the browser continues to read markup language tags and content. If at step 526, the browser session has ended, then the operation ends.

FIG. 6 depicts exemplary pseudo code of the operation that is performed in step 518 of FIG. 5 in accordance with an illustrative embodiment of the present invention. Pseudo code 600 indicates that after the script start, <SCRIPT>, has been found, then the text is parsed using various tokens as identifiers and information is generated using document.write calls.

FIG. 7 is exemplary code that is processed using the utility application in accordance with an illustrative embodiment of the present invention. In the exemplary hypertext markup language of section 702, a browser, such as browser 400 of FIG. 4, determines the presence of a utility script, jscp.js. The browser then initiates the related utility application. The utility application first looks for the start of the script within the hypertext markup language. The utility script then parses the text as shown in section 704. Finally the utility application generates the information as shown in section 706 and this information is sent to the browser to be rendered on the user's display.

FIG. 8 is exemplary code including a cascading style sheets file that is processed using the utility application in accordance with an illustrative embodiment of the present invention. In section 802 of the depicted example, the cascading style sheets file dynamically sets a "height" property in a "style1" selector based on a value of a JavaScript™ variable, "divHeight", which is set in a hypertext markup language file shown in section 806. The background color is set in a "para_style" selector using the JavaScript™ client pages property method which will look up the value of "myBackgroundColor" from a properties file shown in section 804. Thus, a client-side web content developer is allowed to code dynamic cascading style sheets content in a separate cascading style sheets file without having to directly code it in an hypertext markup language file.

Thus, the different aspects of the present invention generate content dynamically without a Web server. Responsive to a request to display a document containing markup language content on a client data processing system, a determination is made as to whether a utility script is present in the document. A utility application associated with the utility script is loaded on the client data processing system, if the utility script is present. Finally, the utility application processes the utility script to dynamically generate dynamic content for display with markup language content.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating content dynamically without a Web server, the computer implemented method comprising:

responsive to a request to display a document containing markup language content on a client data processing system, determining whether a utility script is present in the document, wherein the markup language is at least one of hypertext markup language and a scripting language;

responsive to the utility script being present, loading a utility application associated with the utility script on the client data processing system, wherein the utility application processes the utility script to dynamically generate dynamic content for display with the markup language content, and wherein processing the utility script to dynamically generate the dynamic content for display with the markup language content further comprises:

scanning information within the document for the start of the utility script;

parsing the information between the start of the utility script and an end of the utility script;

generating code representing at least one call in response to parsing the information, wherein the call is a document application program interface call;

determining if an include file is referenced within the parsed information; and including contents of the include file along with generating the code representing the at least one call responsive to a reference of the include file being present;

displaying the dynamic content in a display on the client data processing system; and displaying the markup language content in the display on the client data processing system.

2. The computer implemented method for generating content dynamically without a Web server of claim 1, where including the contents of the include file along with generating the code representing the at least one call responsive to the reference of the include file being present comprises placing the contents of the include file in-line within the parsed information.

3. The computer implemented method for generating content dynamically without a Web server of claim 2, where placing the contents of the include file in-line within the parsed information comprises expanding a substitution tag associated with the contents of the include file within the parsed information.

4. The computer implemented method for generating content dynamically without a Web server of claim 3, where placing the contents of the include file in-line within the parsed information and expanding the substitution tag associated with the contents of the include file within the parsed information comprises placing the in-line contents of the include file and the expanded substitution tag within a <style> element within the parsed information.

5. The computer implemented method for generating content dynamically without a Web server of claim 3, further comprising reading the in-line contents of the include file and the expanded substitution tag from within the parsed information.

6. The computer implemented method for generating content dynamically without a Web server of claim 1 further comprising, responsive to including the contents of the include file, generating application program interface call script text to implement a command interface.

7. A data processing system comprising:
a bus system;
a communications system connected to the bus system;
a memory connected to the bus system, wherein the memory includes a set of instructions; and
a processing unit connected to the bus system, wherein the processing unit executes the set of instructions to:
determine whether a utility script is present in a document in response to a request to display the document containing markup language content on a client data processing system, wherein the markup language is at least one of hypertext markup language and a scripting language;
responsive to the utility script being present, load a utility application associated with the utility script on the client data processing system, wherein the utility application processes the utility script to dynamically generate dynamic content for display with the markup language content, and wherein processing the utility script to dynamically generate the dynamic content for display with the markup language content further executes the set of instructions to:
scan information within the document for the start of the utility script;
parse the information between the start of the utility script and an end of the utility script;
generate code representing at least one call in response to parsing the information, wherein the call is a document application program interface call;
determine if an include file is referenced within the parsed information; and
include contents of the include file along with generating the code representing the at least one call responsive to a reference of the include file being present;
display the dynamic content in a display on the client data processing system; and
display the markup language content in the display on the client data processing system.

8. The data processing system of claim 7, where in executing the set of instructions to include the contents of the include file along with generating the code representing the at least one call responsive to the reference of the include file being present, the processing unit executes instructions to place the contents of the include file in-line within the parsed information.

9. The data processing system of claim 8, where in executing the instructions to place the contents of the include file in-line within the parsed information, the processing unit executes instructions to expand a substitution tag associated with the contents of the include file within the parsed information.

10. The data processing system of claim 9, where in executing the instructions to place the contents of the include file in-line within the parsed information and to expand the substitution tag, the processing unit executes instructions to place the contents of the include file and the expanded substitution tag within a <style> element within the parsed information.

11. The data processing system of claim 9, where the processing unit executes instructions to read the in-line contents of the include file and the expanded substitution tag from within the parsed information.

12. The data processing system of claim 7, where, responsive to executing the set of instructions to include the contents of the include file, the processing unit executes instructions to generate application program interface call script text to implement a command interface.

13. A computer program product comprising:
a computer usable storage medium including computer usable program code for generating content dynamically without a Web server, the computer program product comprising:
computer usable program code for determining whether a utility script is present in a document in response to a request to display the document containing markup language content on a client data processing system, wherein the markup language is at least one of hypertext markup language and a scripting language;
computer usable program code for, responsive to the utility script being present, loading a utility application associated with the utility script on the client data processing system, wherein the utility application processes the utility script to dynamically generate dynamic content for display with markup language content, and wherein processing the utility script to dynamically generate the dynamic content for display with the markup language content further comprises:
computer usable program code for scanning information within the document for the start of the utility script;
computer usable program code for parsing the information between the start of the utility script arid an end of the utility script;

computer usable program code for generating code representing at least one call in response to parsing the information, wherein the call is a document application program interface call;

computer usable program code for determining if an include file is referenced within the parsed information: and computer usable program code for including contents of the include file along with generating the code representing the at least one call responsive to a reference of the include file being present;

computer usable program code for displaying the dynamic content in a display on the client data processing system; and computer usable program code for displaying the markup language content in the display on the client data processing system.

14. The computer program product of claim 13, where the computer useable program code for including the contents of the include file along with generating the code representing the at least one call responsive to the reference of the include file being present comprises computer useable program code for placing the contents of the include file in-line within the parsed information.

15. The computer program product of claim 14, where the computer useable program code for placing the contents of the include file in-line within the parsed information comprises the computer useable program code for expanding a substitution tag associated with the contents of the include file within the parsed information.

16. The computer program product of claim 15, where the computer useable program code for placing the contents of the include file in-line within the parsed information and for expanding the substitution tag associated with the contents of the include file within the parsed information comprises computer useable program code for placing the in-line contents of the include file and the expanded substitution tag within a <style> element within the parsed information.

17. The computer program product of claim 15, further comprising computer useable program code for reading the in-line contents of the include file and the expanded substitution tag from within the parsed information.

18. The computer program product of claim 13, further comprising computer useable program code for, responsive to including the contents of the include file, generating application program interface call script text to implement a command interface.

* * * * *